United States Patent
Parra et al.

(10) Patent No.: US 8,805,776 B2
(45) Date of Patent: Aug. 12, 2014

(54) RELATIONSHIP SERIALIZATION AND RECONSTRUCTION FOR ENTITIES

(75) Inventors: Sarah M. Parra, Bothell, WA (US); Ravinder R. Vuppula, Redmond, WA (US); Jeffrey M. Derstadt, Seattle, WA (US); Brian Dawson, Redmond, WA (US); Michael J. Pizzo, Bellevue, WA (US); James Madison Stone, III, Sammamish, WA (US); Patrick T. Magee, Sammamish, WA (US); Nadejda V. Poliakova, Redmond, WA (US); Daniel G. Simmons, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 12/146,862

(22) Filed: Jun. 26, 2008

(65) Prior Publication Data

US 2009/0327225 A1 Dec. 31, 2009

(51) Int. Cl.
*G06F 17/30* (2006.01)
(52) U.S. Cl.
USPC .......................................... 707/609; 709/246
(58) Field of Classification Search
USPC .......................................... 707/609; 709/246
See application file for complete search history.

(56) References Cited

U.S. PATENT DOCUMENTS

| | | | |
|---|---|---|---|
| 6,928,488 B1 * | 8/2005 | de Jong et al. | 709/246 |
| 7,165,239 B2 | 1/2007 | Hejlsberg et al. | |
| 7,207,002 B2 * | 4/2007 | Mireku | 715/234 |
| 7,281,207 B2 | 10/2007 | Layman et al. | |
| 2005/0165724 A1 | 7/2005 | West | |
| 2005/0192989 A1 * | 9/2005 | Adiba et al. | 707/101 |
| 2005/0234969 A1 | 10/2005 | Mamou et al. | |
| 2006/0123333 A9 * | 6/2006 | Layman et al. | 715/513 |
| 2006/0190469 A1 | 8/2006 | Kathuria et al. | |
| 2007/0055692 A1 * | 3/2007 | Pizzo et al. | 707/103 R |
| 2007/0114279 A1 | 5/2007 | Lessing et al. | |
| 2007/0282916 A1 | 12/2007 | Albahari et al. | |
| 2009/0164482 A1 * | 6/2009 | Saha et al. | 707/100 |

OTHER PUBLICATIONS

Article entitled "ADO.NET Entity Framework Beta 3 Released" by Flasko, dated Dec. 5, 2007.*
Article entitled "Knocking Off Danny Simmons Entity Framework Beta 2 List: #3 & #4: Entitykey Serialization and New Entity Interfaces" by Lerman, dated Sep. 1, 2007.*
Article entitled "Exploring EntityKeys, Web Services and Serialization a Little Further" by Lerman, dated Sep. 2, 2007.*
Article entitled "EF Beta 3 finally available!" by Simmons, dated Dec. 6, 2007.*
Article entitled "August CTP of the Entity Framework Released" by Simmons, dated Aug. 28, 2007.*

(Continued)

*Primary Examiner* — Mahesh Dwivedi
(74) *Attorney, Agent, or Firm* — Nicholas Chen; David Andrews; Micky Minhas

(57) ABSTRACT

Systems and methods that enable relationship information to be carried along with the entity when serializing/deserializing entities among application tiers. A tracking component tracks information on relationships associated with an entity, and further enables users to perform subsequent change processing on the entity's relationship information. Accordingly, relationship information can be carried along with the entity such that database operation can be performed without requirement of additional information from the database (e.g., foreign key information that is part of associated graphs).

14 Claims, 9 Drawing Sheets

(56) References Cited

OTHER PUBLICATIONS

Article entitled "ADO.NET Entity Framework: Reattaching detached objects in short Lived contexts", by Quintas, dated Feb. 21, 2008.*

Ed Tijgen. WCF & Entity Framework Not Working as Expected. Started Oct. 31, 2007 http://forums.microsoft.com/MSDN/ShowPost.aspx?PostID=2348811&SiteID=1. Last accessed Mar. 31, 2008, 2 pages.

Rick Srahl. LINQ to SQL and Serialization, Sep. 3, 2007. http://csharpfeeds.com/post.aspx?id=6165. Last accessed Mar. 31, 2008, 3 pages.

\* cited by examiner

RELATIONSHIP SERIALIZATION AND RECONSTRUCTION FOR ENTITIES

BACKGROUND

Data has become an important asset in almost every application, whether it is a Line-of-Business (LOB) application utilized for browsing products and generating orders, or a Personal Information Management (PIM) application used for scheduling a meeting between people. Applications perform both data access/manipulation and data management operations on the application data. Typical application operations query a collection of data, fetch the result set, execute some application logic that changes the state of the data, and finally, persist the data to the storage medium.

Traditionally, client/server applications relegated the query and persistence actions to database management systems (DBMS), deployed in the data tier. If data-centric logic, it is coded as stored procedures in the database system. The database system operated on data in terms of tables and rows, and the application, in the application tier, operated on the data in terms of programming language objects (e.g., Classes and Structs). With the advent of the web technology (and Service Oriented Architectures) and with wider acceptance of application servers, applications are becoming multi-tier, and more importantly, data is now present in every tier.

In such tiered application architectures, data is manipulated in multiple tiers. In addition, with hardware advances in addressability and large memories, more data is becoming memory resident. Applications are also dealing with different types of data such as objects, files, and XML (eXtensible Markup Language) data, for example.

In hardware and software environments, the need for rich data access and manipulation services well-integrated with the programming environments is increasing. Moreover, serializing entities (e.g., object representation of data) for subsequent use in n-tier Service Oriented Architecture (SOA) can be burdened with inefficiencies. For example, serializing relationship information is not intuitive at the entity abstraction, and it is burdensome to include adequate information for reconstructing the first class relationship.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for tracking of information related to relationships when serializing/deserializing entities among application tiers—via a tracking component. Such tracking component can include a system employed to track entities throughout their lifetime in a computer system; such as tracking changes made to scalar data properties, relationships, and the like—wherein such changes can include additions, edits, or deletions, for example. Moreover, the tracking component can include key information that are introduced to preserve associations and mitigate a requirement to re-load entities from a database, and hence reduces amount of information involved in roundtrips and in web service operations. Accordingly, relationship information can be carried along with the entity, wherein subsequent database operations can be performed without requirement of additional information from the database (e.g., foreign key information that is part of associated graphs). Moreover, information about related entities in a serialized payload can also be included in the serialized payload. Such an arrangement further enable users to perform subsequent change processing on the entity's relationship information (which can be more efficiently performed than retrieval of the full related entity) and supplies an efficient discovery of information concerning the related entity.

In a related aspect, an entity that exposes a cardinality one relationship can include an EntityReference instance as a property, and by including an EntityKey on such EntityReference, key information can be transported as a proxy for the full entity during serialization.

Whenever an entity is being tracked by a context, the EntityKey information can be represented by either the EntityKey from the full related entity or as a proxy for the full related entity. If an entity that contains a related proxy is attached to a tracking context after a serialization operation, the context determines whether a full entity for the proxy is already being tracked and if it is, the context will transform the entity graph by replacing the proxy with the full entity. Likewise, if the context is not tracking the full related entity, subsequent operations that introduce the full related entity can also cause a transformation where tracked entity graphs are updated with the full related entity.

In a related methodology, initially a query is executed against a database and an entity can be retrieved. Once an entity is obtained, entity references can subsequently be retrieved therefrom, wherein each entity reference can contain the EntityKey that is the combination of data values and set information. A plurality of actions can then be performed via the key, such as serializing schema to a webpage and reducing associated payloads and service calls when updating the database, for example. It is to be appreciated that customer classes can be created to represent entities (e.g., CLR object) and keys can be subsequently associated therewith.

As such, when serializing an entity for use in a multi-tier Service Oriented Architecture (SOA) application, the tracking component includes information about related entities in the serialized payload, wherein such information can serve as a first class proxy for the full related entity. Such further enables users to perform subsequent change operations on the entity's relationship information, and facilitate efficient retrieval of the full related entity for discovery of associated information. When the proxy is introduced into an object relational mapping (ORM) context, it is also necessary for the proxy to be replaced in all entity graphs with the full entity if it is present in the context. Moreover, the entity relationship information can be serialized to a variety of formats that are interoperable between different computer architectures.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
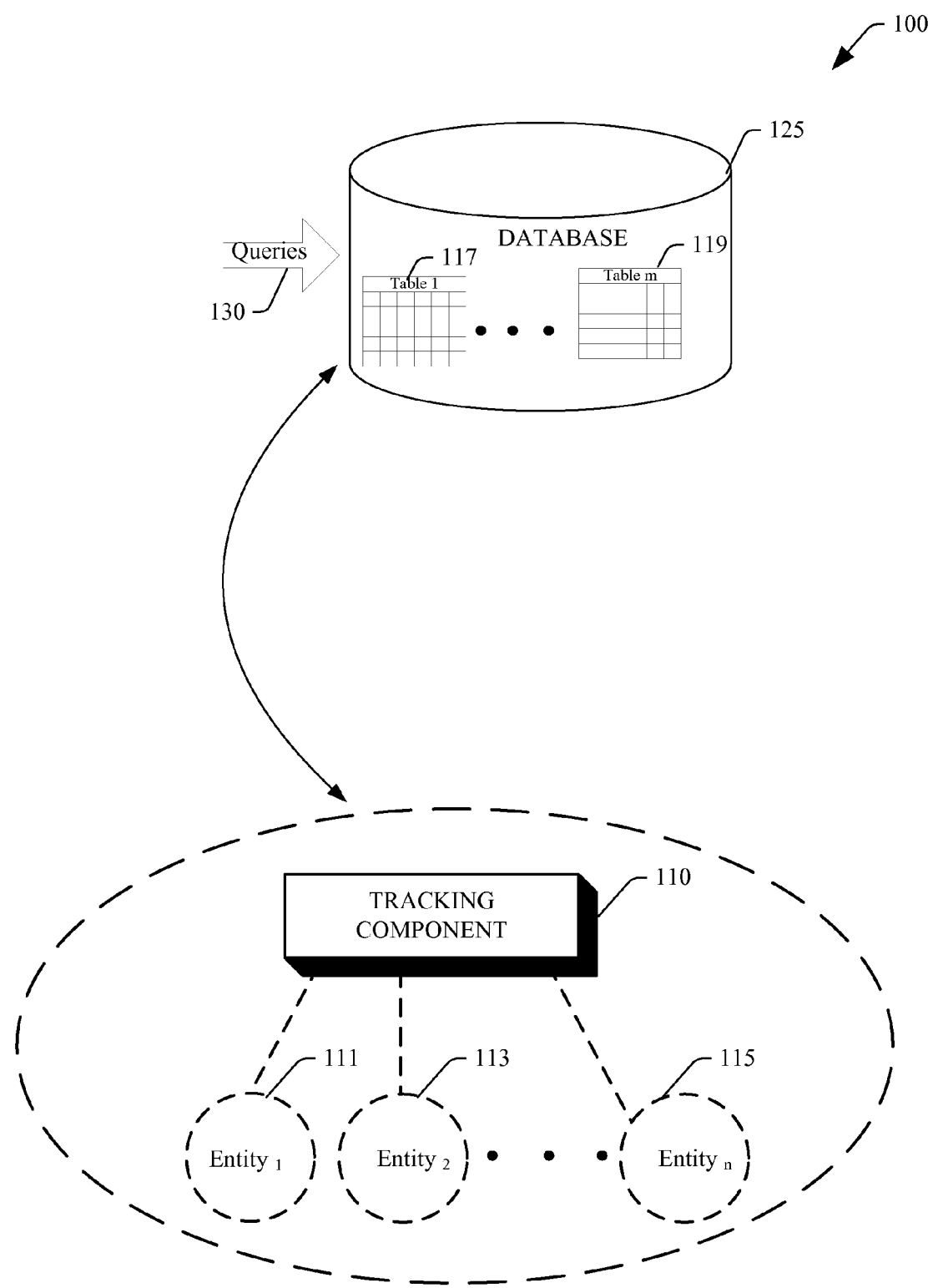
FIG. 1 illustrates a block diagram of a tracking component that tracks entity relationships when serializing/deserializing entities according to an aspect of the subject innovation.

FIG. 1 illustrates a block diagram of a system 100 that employs a tracking component 110 when serializing/deserializing entities 111, 113, 115 (1 thru n, n being an integer) according to an aspect of the subject innovation. The tracking component 110 can include key information that are introduced to preserve associations and mitigate a requirement to re-load entities 111, 113, 115 from the database 125, and hence reduces amount of information involved in roundtrips and in web service operations. Any of such entities 111, 113, 115 can include a particular object type within a multi-dimensional structure, wherein such structure exists within a data store of the database 125. The multi-dimensional structure can be, for instance, a data cube, a dimension associated with a data cube and/or a sourceless dimension, an attribute hierarchy, an attribute, or the like. In general, in such an environment, an EntityKey can represent information that is required to identify an entity that includes a set of data values and a set identifier. Likewise, an EntityReference represents a cardinality one relationship, and can include three pieces of information: the relationship meta information using to identify this relationship, the full value of the related entity, and the key value of the related entity.) It is to be appreciated that a relationship, as defined by the Entity Data Model, is a first class construct. Hence, such a relationship is not merely a primary-key to foreign key relationship (e.g., an example for such difference is that a first class relationship can include a link table, such as many to many relationship that cannot be done with a typical foreign key.

Moreover, the queries 130 to the database 125 can be constructed in accordance to a standard query language (e.g., structured query language (SQL)) in order to access content of the tables 117, 119 (1 thru m, m being an integer) in the database 125. Likewise, data can be input (e.g., imported) into the tables 117, 119 via an external source, and the Database 125 can typically be modeled by using data modeling languages, such as the Entity Data Model, and the Unified Data Model Language (UML)—which supply representations in form of entities and relationships. For example, in a database that holds data relating to Authors and Documents, the document and author can be treated as entities, and "WrittenBy" can be designated as a relationship. A relationship definition commonly can have a cardinality associated therewith. As such, in a database environment there can exist one-to-one (1:1), one-to-many (1:N), and many-to-many (N:M) relationships (where N and M are integers)—wherein one-to-one and one-to-many relationships can be captured in SQL through referential constraints. Likewise, many-to-many relationships can typically be modeled by introducing an intermediate table (e.g., WrittenBy) that captures such relationship. Moreover, relational joins can be provided that dynamically learn the various relationships created—(as compared to the static existing foreign key (FK)-primary key (PK) relationship)—so as the database grows, such relation join can guide the compiler to spell out the reference join.

The existing relationships can be in form of a primary key (PK)-foreign key (FK), wherein the foreign key can be a column or combination of columns used to establish and enforce a link between the data of a source table and a target table, for example. As explained earlier, the tables 117, 119 can tabulate: "Document", "Author", and "Written by" in a many-to-many relationship that exists among them, wherein Document and Author are entities, while WrittenBy is a relationship. Typically, such a relationship definition has a cardinality associated therewith. It is to be appreciated that the above example is for illustrative purposes, and there can exist one-to-one (1:1), one-to-many (1:N), and many-to-many (N:M) relationships (N and M being integers), wherein such relationships can be typically captured in SQL through referential constraints, and many-to-many relationships are commonly modeled by introducing an intermediate table (e.g., WrittenBy) that can capture the relationship.

As such, for an entity that exposes a cardinality one relationship as an EntityReference instance as a property, the tracking component 110 of the subject innovation supplies an EntityKey on such EntityReference, wherein key and set information can be transported as a proxy for the full entity during serialization. Whenever an entity is being tracked by a context, the EntityKey information can be represented by either the EntityKey from the full related entity or as a proxy for the full related entity. If an entity that contains a related proxy is attached to a tracking context after a serialization operation, the context determines whether a full entity for the proxy is being tracked and if it is, the context will transform the entity graph by replacing the proxy with the full entity. Likewise, if the context is not tracking the full related entity, subsequent operations that introduce the full related entity will also cause a transformation where tracked entity graphs are updated with the full related entity.

Figure 2:
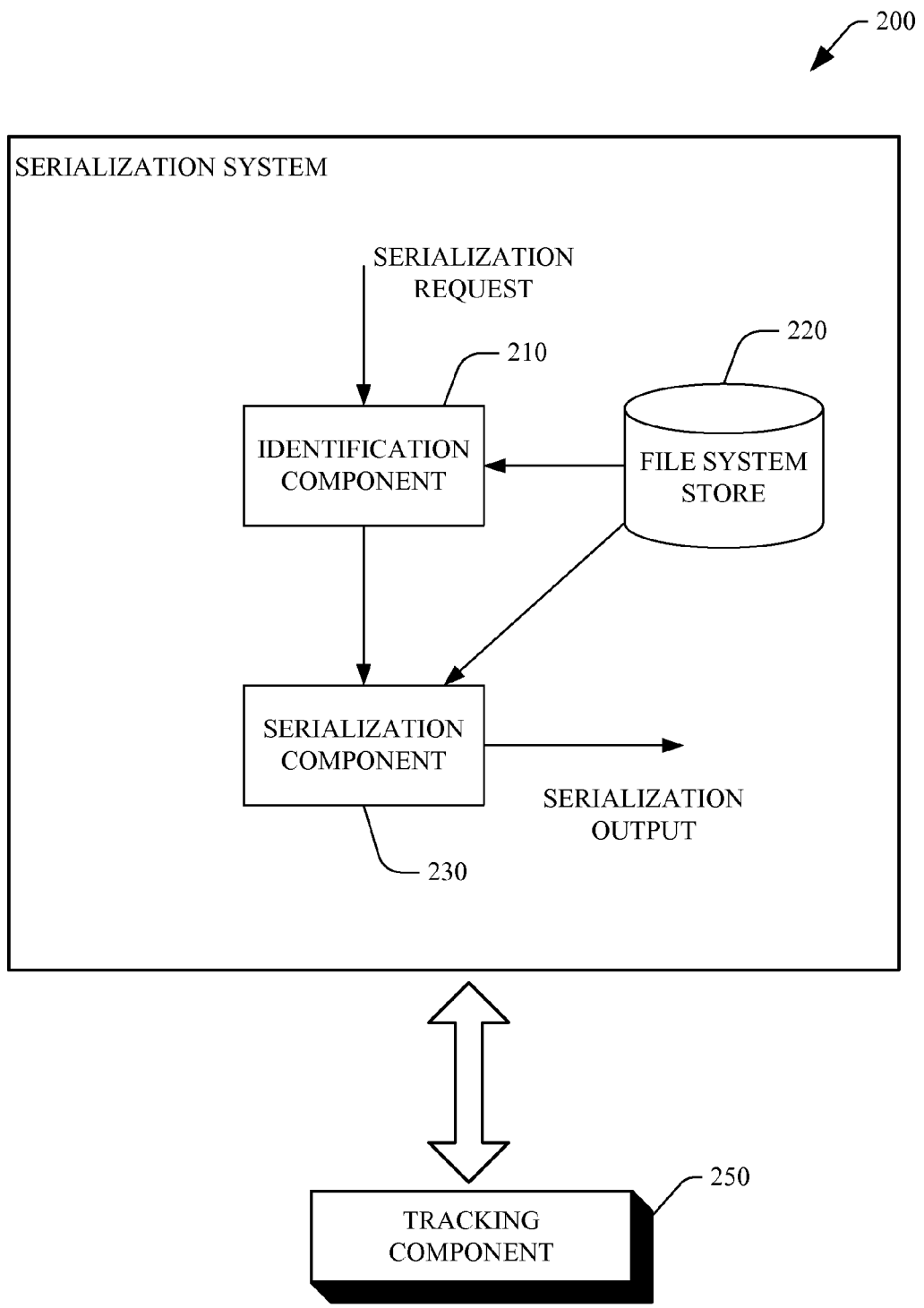
FIG. 2 illustrates a serialization system that interacts with a tracking component according to an aspect of the subject innovation.

FIG. 2 illustrates a serialization system 200 that interacts with a tracking component 250 in accordance with an aspect of the subject invention. The system 200 can be employed to serialize an item and entity(ies) associated therewith. Such system 200 can further generate and serialize a header that includes information associated with the item and associated entity(ies). As compared to conventional systems, the subject innovation enables relationships to be reconstructed when attached to the tracking component 250. For example, one conventional serialization is the scenario of a Foreign key serialization, wherein an entity is serialized and part of that entity are data values that refer to a related entity. Another example of conventional serialization can include full graph serialization, wherein the relationship is serialized by way of both ends of the relationship being serialized. This contains substantial amount of data because two full entities are being serialized. In contrast to such scenarios, the subject innovation enables an EntityKey for the related entity to be serialized along with an entity, to reconstruct the relationship when attached to the tracking component 250.

As illustrated, the serialization system 200 includes an identification component 210 that identifies entity(ies) associated with an item. The identification component 210 can obtain information regarding the item from a file system store 220. The information can include item fragment(s), extension(s), outgoing link(s), incoming link(s) and/or embedded item(s), for example. The serialization system 200 further includes a serialization component 230 that serializes the item and associated entity(ies). The serialization component 230 can further generate and serialize a header that includes information associated with the item and associated entity(ies). The header can facilitate random access to the item and associated entity(ies) (e.g., allowing a reader to interpret/parse only the parts in which it is interested). The tracking component 250 permits relationship information to be carried along with the entity, such that database operation is performed without requiring additional information from the database (e.g., foreign key information that is part of associated graphs). Hence, information about related entities in a serialized payload can also be included in such serialized payload. This arrangement further enables users to perform subsequent change processing on the entity's relationship information (which can be more efficiently performed than retrieval of the full related entity) and better discovery of information concerning the related entity.

Figure 3:
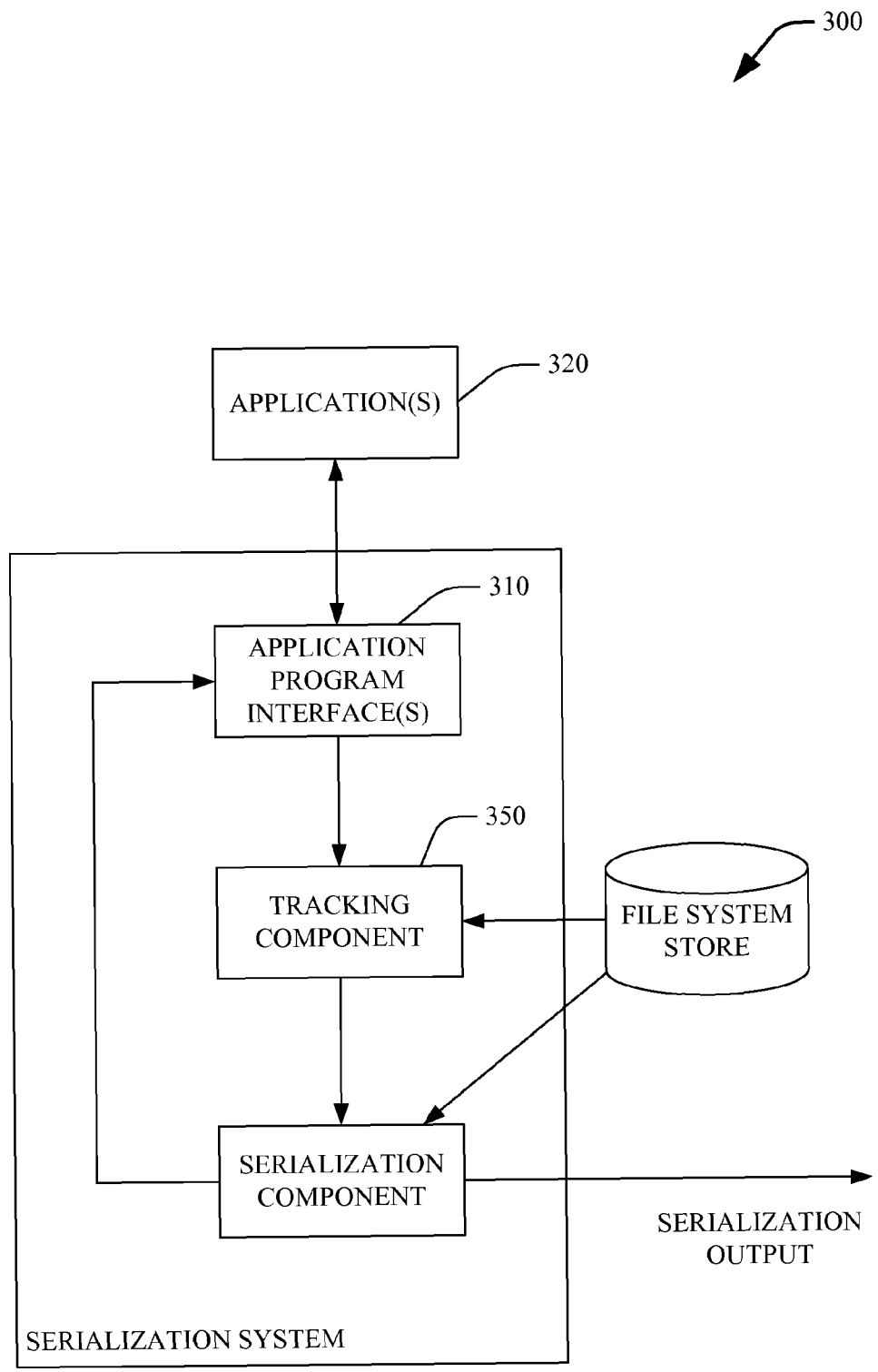
FIG. 3 illustrates a further serialization system that employs a tracking component in accordance with an aspect of the subject innovation.

FIG. 3 illustrates a further serialization system 300 that implements a tracking component of the subject innovation. An APIs 310 facilitates communication between the system 300 and application(s) 320. For example, the APIs 310 can facilitate copying, moving and/or transfer of an item and its associated entity(ies) from one location to another location (e.g., separate computer system and/or removable media). Thus, the APIs 310 can be employed for item level operations such as Export, Backup, Restore, Copy, and the like. In one example, the application 320 can selectively include all or part(s) of an item by providing serialization information (e.g., flag(s)) to the API 310. The APIs 310 can be exposed at the file system level and/or at the store procedure level. The tracking component 350 enables tracking of information on relationships, and can typically employ two aspects, namely:graph management and serialization.

Graph Management

EntityReference

EntityReference can contain a public read-write EntityKey property. The value returned from such property can be the current EntityKey for that side of the relationship. Moreover, such property's value can be retrieved differently depending on the state of the owning entity. For example for the scenarios of, A. Retrieving the Value of the EntityReference.EntityKey Property while the Entities are in the ObjectStateManager (aka Attached Graphs):

For attached entities when the EntityKey property is accessed, the tracking context can look up the appropriate value as follows:

If EntityReference.Value is non-null, the context can look up the EntityKey for that entity in the state manager and return it. For attached entities the context can determine an EntityKey.

If EntityReference.Value is null, there can exist a relationship with a stub entry (proxy for a full entity), so next the context can look through the source entity's relationships to verify if it can find an Added or Unchanged one. Moreover, there can exist a single added or one Unchanged relationship that can match what the context is looking for, so as soon one is found, the context can return the EntityKey for the other side. Moreover, if the EntityKey for the object is temporary or one of the special keys, the EntityKey property can return null.

B. Retrieving the Value of the EntityReference.EntityKey Property while the Entities are not in the ObjectStateManager (aka Detached Graphs):

For detached entities, the EntityReference.EntityKey property can return the value of a private field that stores the EntityKey value, which will have been set during serialization or Detach as described supra. Such occurs as there is no tracking component to lookup the key or metadata to create the key.

Setting the EntityReference.EntityKey Property:

For attached scenarios, setting of temporary keys or special keys like EntityKey.NoEntitySetKey is typically not permitted, and an exception is incorporated in such cases. For detached graphs, due to some serialization scenarios that build the key up in stages, setting these key values is allowed, and yet can fail with the same exception when attempting to Add/Attach an EntityReference to a tracking context with one of these keys.

For attached graphs, if the user sets the EntityKey property, the following behavior can be demonstrated:
1. The context can locate an ObjectStateEntry for the EntityKey, and if one does not exist, the context can add a key entry in the unchanged state (key/stub entries are always Unchanged).
2. If an ObjectStateEntry with that key is found, or if one is created, the Value property can be set to null on the reference, and will create a new Added relationship between the source entity and the stub. If Value was previously non-null, such can also mark that relationship as Deleted.
3. If a real entity entry with that key is located, the EntityReference.Value is set to that new entity. Such has the effect of marking the existing relationship as Deleted and adding a new one in the Added state.

Such can further have the same effect as setting the Value property, wherein it is typically not necessary to have the whole target entity in order to create the relationship. Accordingly, in the end, the relationship can be with a proxy/stub instead of a real entity.

Likewise, for detached graphs, if the user sets the EntityKey property it can exhibit the following behavior:
1. The value can be set regardless of whether EntityReference.Value is null or not.
2. If EntityReference.Value is not null,one cannot always obtain an EntityKey from that entity because it may not even implement IEntityWithKey (the Entity Framework's mechanism for accessing an EntityKey on an entity), or may not have a key set at all, and the entity cannot create one because it doesn't have the metadata to know how to do that (because it is detached from a context). Therefore, at the time the property is set no comparison between the EntityKey on the Value and the one being set directly on the EntityReference can be performed.

3. If EntityReference.Value is not null, when the entity is attached or added to the context the key on that entity can always be determined and if it does not match the one in the EntityReference.EntityKey, the context can implement an exception.

Saving the Value of the EntityReference.EntityKey Property During ObjectContext.Detach, and NoTracking Scenarios:

Because the EntityKey property should typically be accessible on detached entities, and therefore cannot employ the lookup strategy described above for attached entities, during ObjectContext.Detach, full span with NoTracking, and Load with NoTracking, the EntityKey should typically be privately maintained in a field on the EntityReference.

In addition, for detached graphs that were retrieved with MergeOption.NoTracking and full span or Load, the context and materializer can have to set the EntityReference.EntityKey at the time that the relationship is created during span/Load.

With ObjectContext.Detach, the context traverses the detached entity and disconnects the related ends. Before each EntityReference is cleared, the value of the EntityKey property (which can perform the lookup as described above) should typically be saved into the privately maintained field. Such process can also separately detach relationships with stub entity entries in the ObjectStateManager, such that it can also save EntityKey into an EntityReference at that point for any of these relationships that are in the Added or Unchanged state.

Behavior when Manually Creating Relationships

A relationship can be considered to be manually created by the user in the following cases:

EntityReference.Value is set

EntityCollection.Add is used to create a relationship in a 1-to-many scenario (because the the relationship manager always hook up both sides of the relationship, the Value is set here)

When you call IRelatedEnd.Add on an EntityReference

The following describes the expected effect on the EntityKey property when manually creating relationships on an attached entity. The behavior on an attached entity is dependent on how the setting of the Value affects the relationships in the state manager. For example, if the Value is set to a particular entity, the resulting EntityKey property value can be the same as the key on that Value, unless the Value is in the Added state in which case it can have a temporary key and EntityKey can return null. If the Value is set to null, the EntityKey can be null. In one aspect, even if the Value was already null, setting it to null again can ensure that an Added or Unchanged relationship with a stub can be deleted.

The following is the expected effect on the EntityKey property when manually creating relationships on a detached entity: The EntityKey property can maintain its value when the Value of the relationship is set.

Behavior During Attach/AttachTo/AddObject:

When adding an entity to a context with ObjectContext.Attach/AttachTo/Add, as the context traverses the graph, if it finds a stub EntityReference it can also implement the following additional rules:

1. There can exist a real entity or stub entity entry already in the context with the same key as the stub EntityReference. In such case, the context can add a new relationship between the source entity and the key in the stub EntityReference. If the target end is a real entity and it is a 1:1 relationship, the context typically needs to hook up the related ends between the entities.

2. If there exists no entity state entry with the same key as the stub EntityReference, the context needs to add a stub entry as well as the new relationship.

After adding a relationship with Attach/AttachTo/AddObject, the context will not null out the privately maintained EntityKey stored in the EntityReference because although it is not meaningful on attached entities, it is also not used. However, there are some cases where it is important to do null it out later on, such as when deleting relationships. Such typically ensures proper operation when an entity is later serialized or detached and only Deleted relationships exists, then the EntityReference will not incorrectly pick up an old value.

The context can also verify that if an EntityReference has both an EntityKey and a Value, that the EntityKey is the same as the EntityKey for the entity in Value. Note that when an entity is added to the tracking context, all entities are Added with temporary keys, so in that case, because it is not allowed to set temporary keys on the EntityKey property, the EntityKey property will have to be null.

Serialization

Binary: With binary serialization, the RelationshipManager is serialized on an entity, which includes all of its collections and references. This can automatically serialize the privately maintained EntityKey field on each EntityReference, but an entity has to make sure it gets set prior to serialization, since it will not be kept updated for attached entities.

Such can be performed by employing the .NET Framework's binary serialization mechanism OnSerializingAttribute. Accordingly, if the RelationshipManager is already detached from a context (including NoTracking), it will do nothing since the private EntityKey fields can already be set at that point. If the RelationshipManager is attached to a context, it can traverse through the Added or Unchanged relationship entries for the source entity and set the private EntityKey fields on all of the references that are found. Such can further automatically pick up all of the references that were already known to the RelationshipManager (e.g., those that have actual Values in them) as well as those that are still associated with stubs only (in which case a call to GetRelatedEnd can automatically create a new EntityReference as well).

Windows Communication Foundation (WCF):

To enable WCF serialization, the EntityReference class can be attributed with DataContract and the EntityKey property can be attributed with DataMember. All navigation properties that return EntityReference can also require the DataMember attribute in order for that relationship to be serialized with the entity, so codegen can automatically add this attribute to those properties.

XML

To enable XML serialization, the EntityKey property can include a public getter and setter. All navigation properties that return EntityReference can also require a public getter and setter in order to be serialized, so codegen can provide a setter for these properties. Such setter can be represented by:

```
set
{
    if ((value != null))
    {
        ((global::System.Data.Objects.DataClasses.IEntityWith-
        Relationships)
            (this)).RelationshipManager.InitializeRelatedReference
```

-continued

```
        <Category>("ObjectServices.EntityReferenceTest.-
        Northwind.CategoryProduct", "Category",
        value);
    }
}
```

In the above, InitializeRelatedReference<T>(string relationshipName, string targetRole, EntityReference<T>entityReference) is a public method on the RelationshipManager. Its purpose is to call GetRelatedReference<T> with the same arguments, and instead of creating a new reference and setting all of the necessary internal members, it can set such members directly onto the EntityReference that is passed in.

Such can incorporate an exception if the EntityReference is already initialized (e.g., if it has an owner) or if the source entity is attached to a context. If the source entity already has an EntityReference with the same properties as the new one, it has to just remove the old one and add the new one to the list of relationships in the RelationshipManager.

Figure 4:
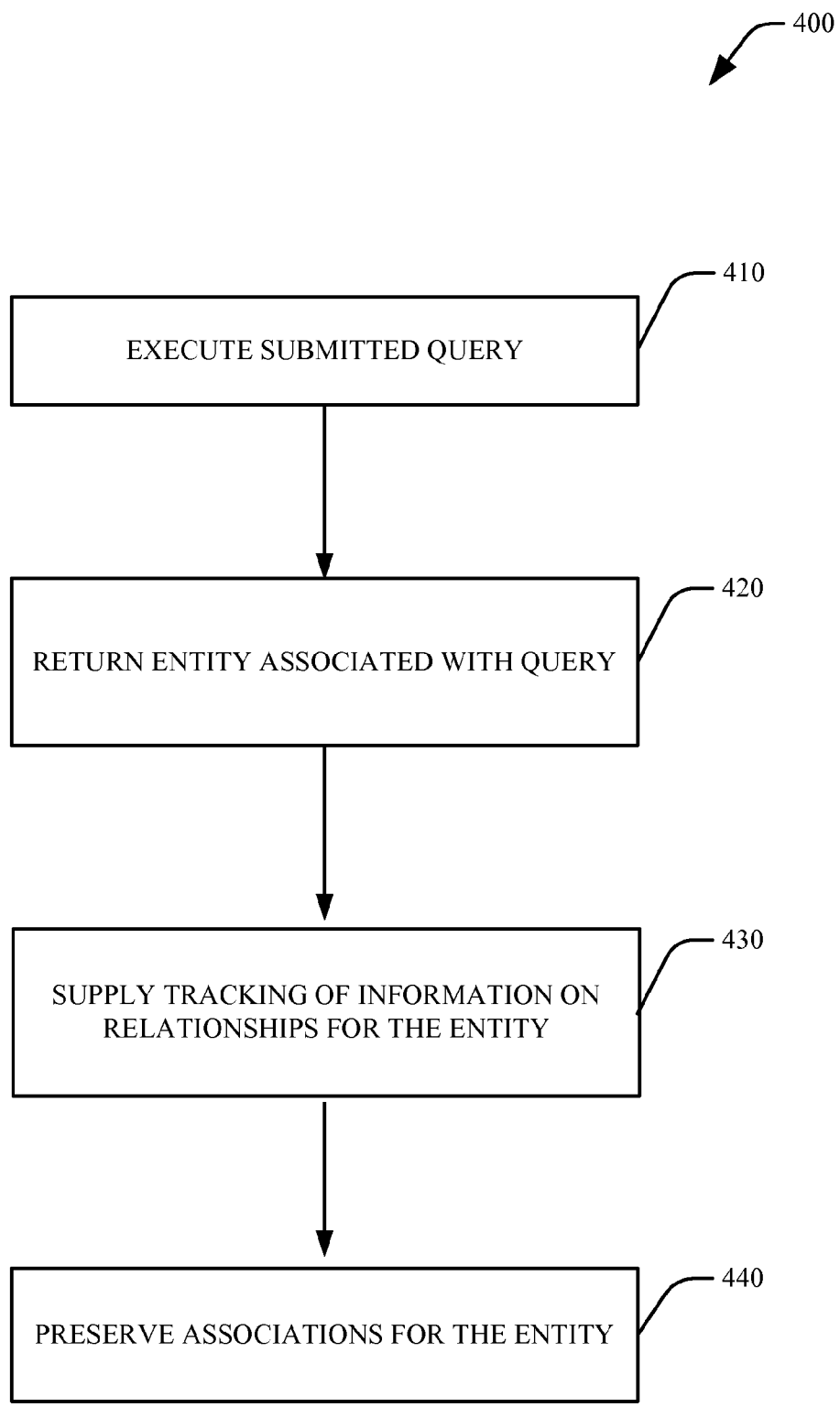
FIG. 4 illustrates a methodology of tracking relationships according to an aspect of the subject innovation.

FIG. 4 illustrates a related methodology of tracking relationships according to an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 410, a query is executed against a database to retrieve an entity at 420. At 430 a tracking component supplies information that enables tracking of relationships associated with the entity. Such tracking component can include key information that are introduced to preserve associations at 440, and hence mitigate a requirement to re-load entities from a database, and further reduces amount of information involved in roundtrips and in web service operations.

Figure 5:
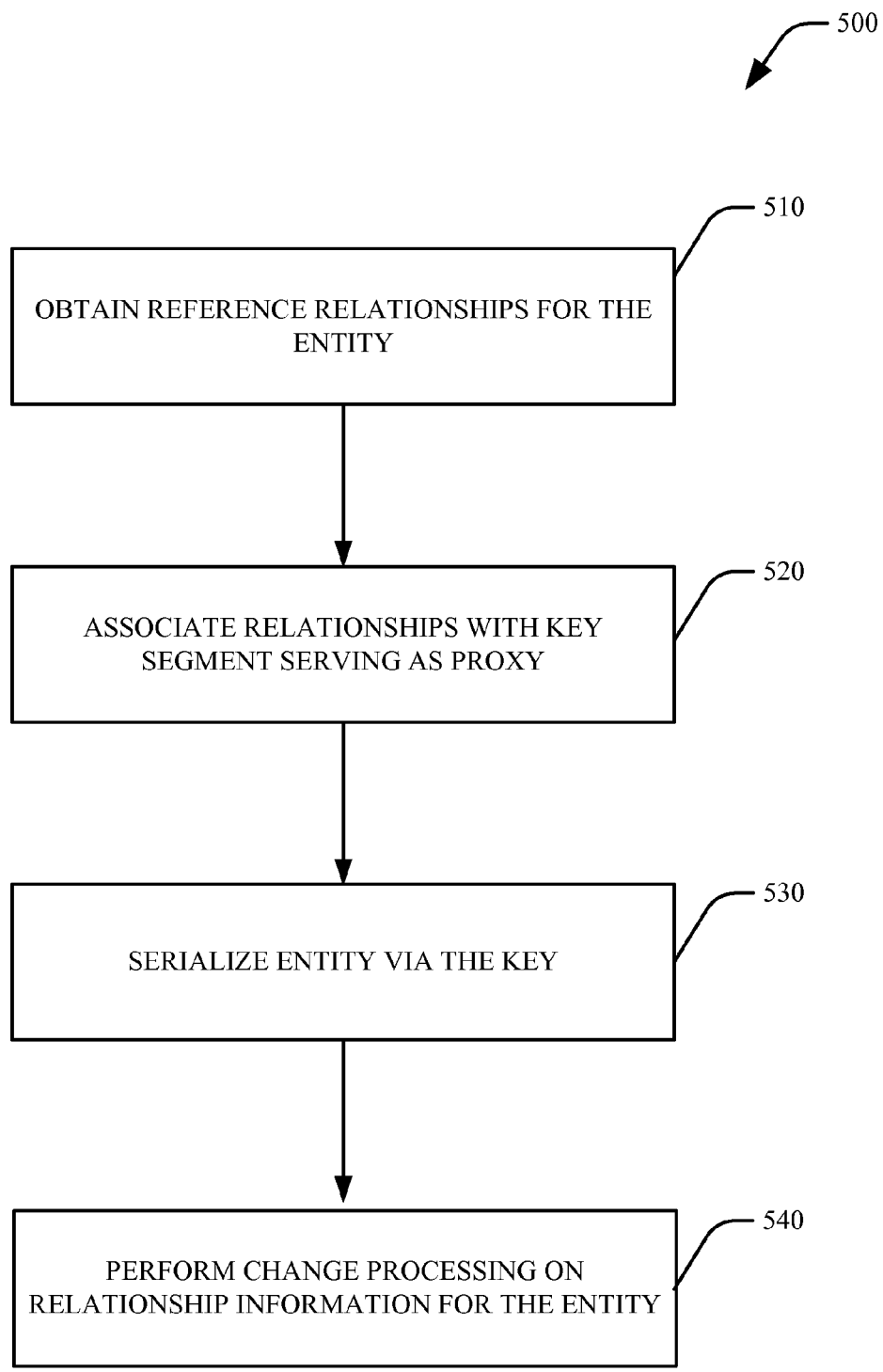
FIG. 5 illustrates a further methodology of serializing/deserializing an entity via a tracking component according to a particular aspect of the subject innovation.

FIG. 5 illustrates a related methodology of serializing/deserializing an entity via the tracking component in accordance with an aspect of the subject innovation. Initially and at 510, reference relation ships for the entity can be obtained from the tables of the database. The tracking component can include key information that are introduced to preserve associations and mitigate a requirement to re-load entities from a database, wherein the key information can be transported as a proxy for the full entity during serialization. For example and as described in detail supra, whenever an entity is being tracked by a context, such Key information can be represented by either an EntityKey from the full related entity or as a proxy for the full related entity. Subsequently and at 530, serialization processes can be initiated, wherein if an entity that contains a related proxy is attached to a tracking context after a serialization operation, the context can determine whether a full entity for the proxy is being tracked. If so, the context can transform the entity graph by replacing the proxy with the full entity. Likewise, if the context is not tracking the full related entity, subsequent operations that introduce the full related entity can also cause a transformation where tracked entity graphs are updated with the full related entity. Accordingly, change processing can be readily performed on relationship information for the entity, to reduce amount of information involved in roundtrips and in web service operations.

Figure 6:
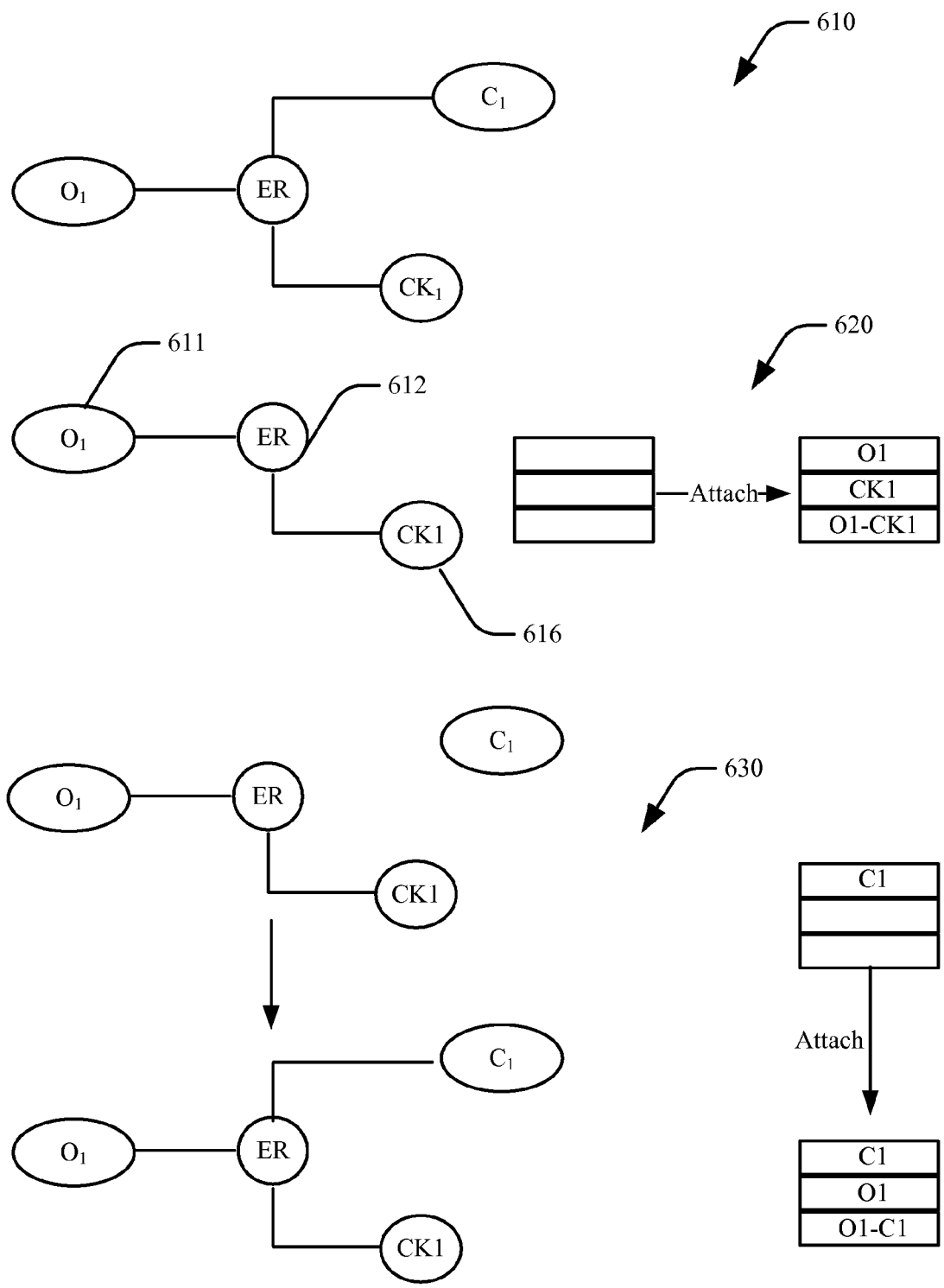
FIG. 6 illustrates an exemplary block diagram of attaching entities via a tracking component in accordance with an aspect of the subject innovation.

FIG. 6 illustrates an exemplary block diagram of attaching entities via a tracking component in accordance with an aspect of the subject innovation. In one aspect, the entity can already contain full entity that transforms the entity graph to include the full entity. For example, 610 can represent original entity after serialization, and 620 illustrates a scenario of attaching an entity to an empty tracking context that creates proxy entry O1-CK1. As such, O1 611 can represent an order, and the ER 612 represents the entity reference that is associated with information on the customer, which includes the full customer records with the key information represented as CK1 616. Accordingly, a plurality of actions can be performed with such keys such as serializing scheme to a web page, wherein instead of taking the O1 and creating a new relation ship and move it to another customer, the key can supply a pointer to such other customer. Hence, information about related entities in a serialized payload can also be included in the serialized payload. Such an arrangement further enables users to perform subsequent change processing on the entity's relationship information (which can be more efficiently performed than retrieval of the full related entity) and better discovery of information concerning the related entity. Likewise, 630 illustrates attaching the entity to a tracking context that already contains the full entity C1 transforms the entity graph to include the full entity.

Figure 7:
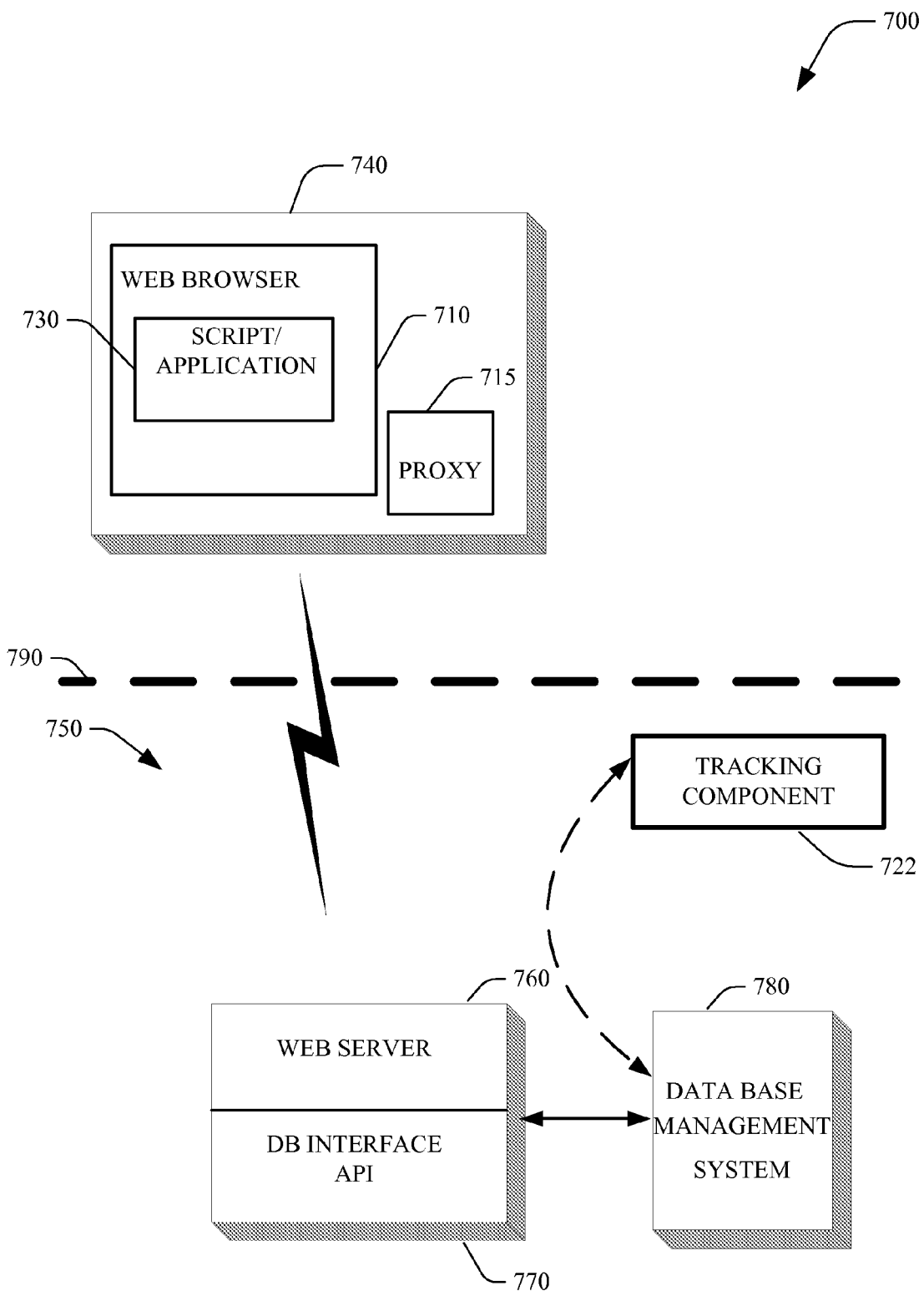
FIG. 7 illustrates a system that implements a tracking component that enables tracking of information related to relationships when serializing/deserializing entities among application tiers.

FIG. 7 illustrates a system 700 that implements a tracking component 722 that enables tracking of information related to relationships when serializing/deserializing entities among application tiers, wherein running on the client 720 is a client process, for example, a web browser 710. Likewise, running on the server 750 is a corresponding server process, for example, a web server 760. In addition, embedded in the Web Browser 710 can be a script or application 730, and running within the run-time environment 740 of the client computer 720, can exist a proxy 715 for packaging and unpacking data packets formatted in accordance with various aspects of the present invention. Communicating with the server 750 is a database management system (DBMS) 780, which manages access to a database (not shown). The DBMS 780 and the database (not shown) can be located in the server itself, or can be located remotely on a remote database server (not shown). Running on the Web server 760 is a database interface Applications Programming Interface (API) 770, which provides access to the DBMS 780. The client computer 720 and the server computer 750 can communicate with each other through a network 790. When the client process, e.g., the Web browser 710, requests data from a database, the script or application 730 issues a query, which is sent across the network (e.g. internet) 790 to the server computer 750, where it is interpreted by the server process, e.g., the Web server 760. The client's 720 request to server 750 can contain multiple commands, and a response from server 750 can return a plurality of result sets.

In one example, responses to client commands that are returned can be self-describing, and record oriented; (e.g. the data streams can describe names, types and optional descriptions of rows being returned.) On the client side 720 the data can be a login record, or a Structured Query Language (SQL) command being in a language that the server side 750 can accept, a SQL command followed by its associated binary data (e.g. the data for a bulk copy command), or an attention signal. When a connection is desired, the client 720 can send a login data stream to the server. Even though the client 720 can have more than one connection to the server 750, each connection path can be established separately and in the same manner.

Once the server 750 has received the login record from the client 720 it can notify the client that it has either accepted or rejected the connection request. Like wise to send SQL command or batch of SQL commands; then the SQL command (e.g. represented by a Unicode format) can be copied into the data section of a buffer and then sent to the SQL Server side 720. A SQL batch may span more than one buffer. In addition, various Open Data Base Connectivity (ODBC) routines can cause SQL command to be placed into a client message buffer, or can cause the message buffer to be sent to the server. As illustrated in FIG. 7, the tracking component 722 enables relationship information to be carried along with the entity such that database operation can be performed without requirement of additional information from the database (e.g., foreign key information that is part of associated graphs). Hence, information about related entities in a serialized payload can also be included in the serialized payload. Such an arrangement further enable users to perform subsequent change processing on the entity's relationship information (which can be more efficiently performed than retrieval of the full related entity) and better discovery of information concerning the related entity.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 8:
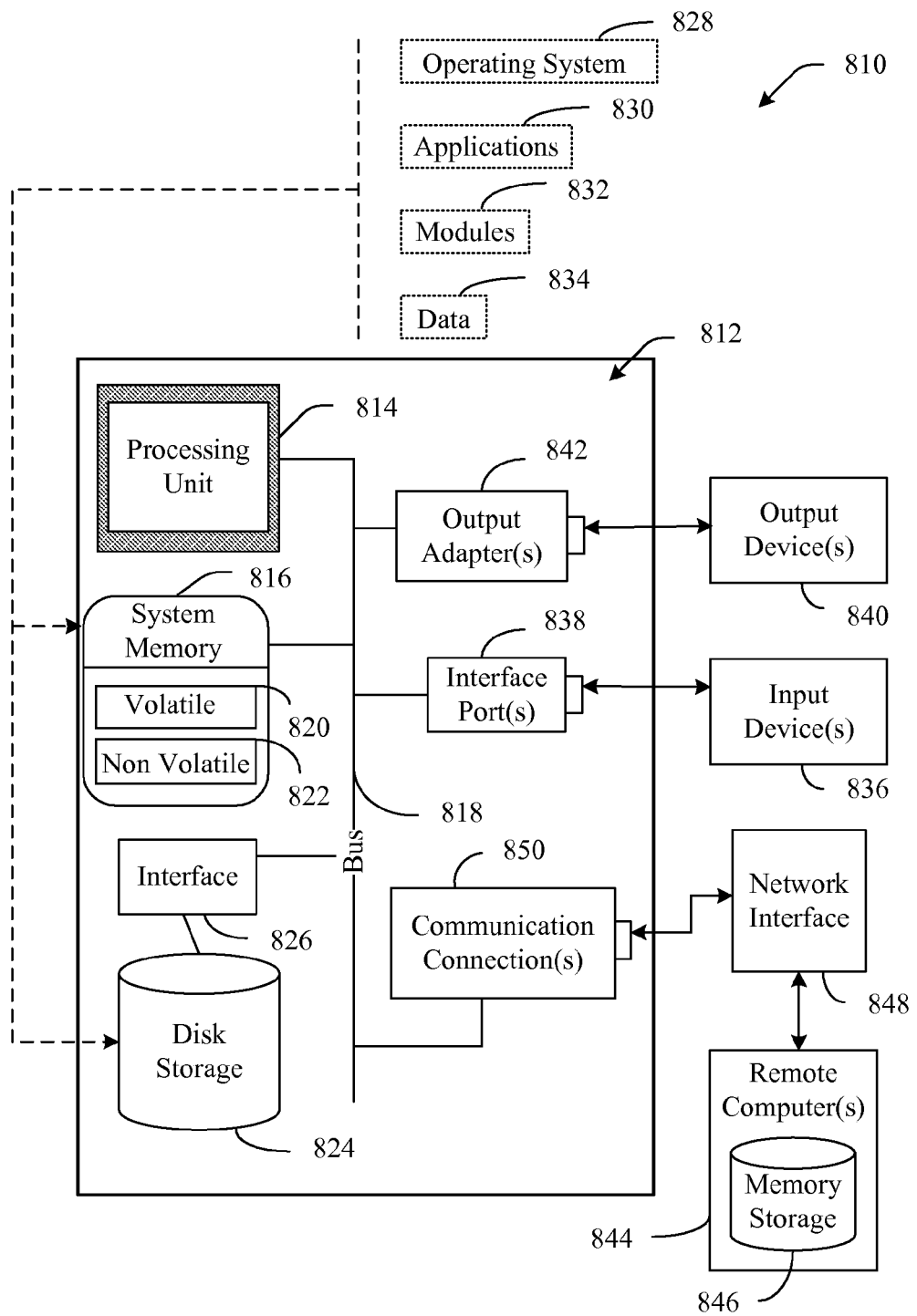
FIG. 8 illustrates an exemplary environment for implementing various aspects of the subject innovation.
Figure 9:
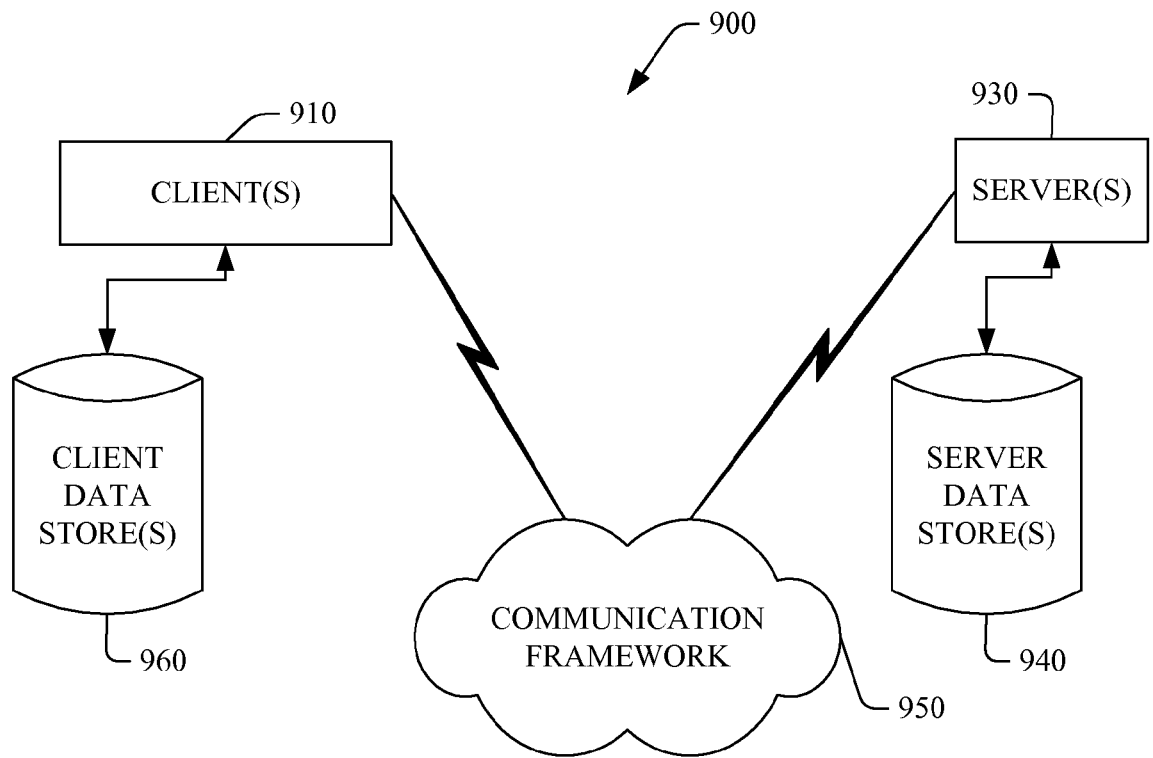
FIG. 9 is a schematic block diagram of a sample-computing environment that can be employed for a tracking according to an aspect of the subject innovation.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 8, an exemplary environment 810 for implementing various aspects of the subject innovation is described that includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates a disk storage 824, wherein such disk storage 824 includes, but is not limited to, devices like a magnetic disk drive, floppy disk drive, tape drive, Jaz drive, Zip drive, LS-60 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 that can be employed for implementing the tracking component of the subject innovation. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operatively connected to one or more client data store(s) 960 that can be employed to store information local to the client(s) 910. Similarly, the server(s) 930 are operatively connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising at least one processor and at least one computer-readable storage medium comprising a magnetic storage device having instructions executable by the at least one processor to implement:
- an entity having a plurality of relationships associated therewith;
- a tracking component configured to track information associated with at least one of the plurality of relationships, when serializing or deserializing the entity among multiple tiers of a database, the tracking component configured to preserve the at least one of the plurality of relationships by attaching key information to the entity such that the key information acts as a proxy for a relationship between the entity and a related entity during at least the serializing, wherein a retrieval of a value included in the key information follows either a first retrieval protocol if the entity is in a first state or a second retrieval protocol if the entity is in a second state, the first state corresponding to the entity being included in an attached graph and varying according to whether the value is null or non-null, the second state corresponding to the entity being detached.

2. The computer-implemented system of claim 1, the tracking component being further configured to implement the key information to mitigate a requirement to re-load the entity from the database.

3. The computer-implemented system of claim 1, the entity having a reference property.

4. The computer-implemented system of claim 2 further comprising a web service configured to retrieve information based on a key reference.

5. The computer-implemented system of claim 4 further comprising a client application configured to process the key reference for updating the database.

6. The computer-implemented system of claim 4 further comprising a context associated with the entity for transformation of an entity graph.

7. The computer-implemented system of claim 6, the relationship having a form of a primary key-foreign key.

8. The computer-implemented system of claim 7 further comprising an identification component as part of a serialization system for identification of an item.

9. The computer-implemented system of claim 8 further comprising an API for transfer of the entity from one location to another location.

10. The computer-implemented system of claim 1, wherein the first retrieval protocol comprises looking up the value in the attached graph when the value is non-null.

11. The computer-implemented system of claim 1, wherein the first retrieval protocol comprises analyzing source relationships when the value is null, the source relationships corresponding to relationships associated with a source of the entity.

12. The computer-implemented system of claim 1, wherein the second retrieval protocol comprises retrieving the value from a private field.

13. The computer-implemented system of claim 12, wherein the value included in the private field is set during serialization.

14. A computer-readable storage medium, the computer readable storage medium comprising a magnetic storage device having instructions stored thereon, the instructions configured to, in response to execution by one or more computing devices, cause operations including:
- during at least a serialization, referencing an entity;
- associating key information with the referenced entity, the key information indicating a relationship between the referenced entity and another entity;
- attaching the key information to the referenced entity to serve as a proxy for the referenced entity during at least the serialization, wherein a retrieval of a value included in the key information follows either a first retrieval protocol if the entity is in a first state or a second retrieval protocol if the entity is in a second state, the first state corresponding to the entity being included in an attached graph and varying according to whether the value is null or non-null, the second state corresponding to the entity being detached; and
- preserving the referencing during serializations or deserializations.

\* \* \* \* \*